US005148641A

United States Patent [19]

Rushing et al.

[11] Patent Number: 5,148,641

[45] Date of Patent: Sep. 22, 1992

[54] FINNED SLEEVE FOR DRIVEN TYPE SURVEY MONUMENTS

[75] Inventors: William C. Rushing; John D. Hohol, both of Madison, Wis.

[73] Assignee: Berntsen International, Inc., Madison, Wis.

[21] Appl. No.: 718,630

[22] Filed: Jun. 21, 1991

[51] Int. Cl.[5] .......... E01F 9/02

[52] U.S. Cl. .......... 52/103; 52/155; 52/165; 52/728

[58] Field of Search .......... 52/103, 155, 158, 153, 52/165, 728, 154; 175/414, 415; 174/7

[56] References Cited

U.S. PATENT DOCUMENTS

| | | | |
|---|---|---|---|
| 819,637 | 5/1906 | Diesher | 52/153 |
| 1,373,560 | 4/1921 | Holland | 52/153 |
| 3,011,598 | 12/1961 | Galloway et al. | 52/153 |
| 3,066,769 | 12/1962 | Pasquale | 52/165 |
| 3,342,444 | 9/1967 | Nelson | 52/165 |
| 4,087,945 | 5/1978 | Berntsen et al. . | |
| 4,471,588 | 9/1984 | Schrim | 52/165 X |
| 4,502,258 | 3/1985 | Rushing . | |
| 4,625,473 | 12/1986 | Peterson et al. . | |
| 4,921,200 | 5/1990 | Moraly | 52/155 X |

OTHER PUBLICATIONS

NOAA Manual NOS NGS 1, "Geodetic Bench Marks" U.S. Department of Commerce, Sep., 1978, p. 16.

"Specifications and Recommendations for Control Surveys and Survey Marksrs", Surveys and Map Branch Ottowa, Canada, 1978, p. 22.

"Geometric Geodetic Accuracy Standards and Specifications For Using GPS Relative Positioning Techniques", Federal Geodetic Control Comm. Ver. 5.0, May 11, 1988, pp. 46–48.

*Primary Examiner*—David A. Scherbel
*Assistant Examiner*—Robert Canfield
*Attorney, Agent, or Firm*—Foley & Lardner

[57] ABSTRACT

A sleeve is provided for a driven-type survey monument having a penetrating point and cylindrical rod sections to stabilize the monument in the ground. The sleeve has an elongated body having a hollow bore, which receives a first portion of the survey monument, and a plurality of fins formed integrally with and extending outwardly from the elongated body of the sleeve.

21 Claims, 3 Drawing Sheets

FINNED SLEEVE FOR DRIVEN TYPE SURVEY MONUMENTS

FIELD OF THE INVENTION

This invention relates generally to the field of monuments and markers used to mark boundaries in surveying and particularly to the use of driven-type survey monuments.

BACKGROUND OF THE INVENTION

Survey monuments which must be driven deep underground or to an indeterminate point of refusal commonly include several sections of rod which are joined as the monument is installed. After the monument has been fully driven, a marker cap, designed to fit tightly over the monument, is affixed to the top of the uppermost rod.

A particularly useful monument is disclosed by U.S. Pat. No. 4,087,945 to Berntsen, et al. The Berntsen, et al. monument has cylindrical rods which are joined by threaded connectors incorporated within the cylindrical cross-section of the rods and a barbed penetrating point designed to rotate as it is driven such that the threaded connections are tightened during the driving process. Devices incorporating the self-tightening invention disclosed by Berntsen, et al. are relatively easy to install.

Finned monument rods adapted to be driven through the ground are also known as shown in U.S. Pat. No. 4,502,258 to Rushing. Such rods offer rotational and horizontal stability once in place and are thus particularly appropriate for use as survey monuments. Finned rods, however, are generally more resistant to being driven than cylindrical rods and, of course, cannot be used where they must rotate during installation. Moreover, capping a finned rod at the ground surface can be inhibited by the fins. Also, standard marker caps designed for monuments of standard cross-section, particularly cylindrical monuments, cannot be used on the finned sections unless the fins are first severed and the remaining rod is filed down to permit capping. This can prove cumbersome in the field, particularly where the process must be accomplished at or slightly below ground grade.

One type of finned survey monument is disclosed in U.S. Pat. No. 4,625,473, issued Dec. 2, 1986, to Peterson, et al. This patent discloses an anti-twist rod section having at least one fin attached thereon. The fin is attached along a groove so that it may be removed from the anti-twist rod section if desired. The finned sections disclosed by Peterson, et al. are formed as part of the uppermost rod section. Therefore, one must know in advance when to attach the section having the fins. This is not always possible when the monument reaches a point of refusal. Also, because the fins are comprised of metal, the are heavy and difficult to carry into the field. Moreover, being comprised of metal the removal of the fins from the rod section is not always easy.

SUMMARY OF THE INVENTION

A sleeve for a driven-type survey monument according to the present invention comprises an elongated body having a hollow bore, which receives a first portion of the survey monument, and a plurality of fins formed integrally with and extending outwardly from the elongated body.

The sleeve is utilized with a sectionalized driven-type survey monument which includes at least one cylindrical rod section of uniform cross-section, a penetrating point section attached to the lower end of an adjacent cylindrical rod section, and threaded connectors joining the rod sections. Bushings may be utilized to engage the sleeve to the rod section. The top and bottom ends of each rod section and the upper end of the penetrating point section preferably have threaded bores formed therein, and flat surfaces on the ends of the sections surrounding the bores. The penetrating point section may have at least two generally longitudinal barbs, having a biased turning surface thereon to cause rotation of the point section as it is driven into the ground, radially spaced on its periphery. The hollow bore of the sleeve receives a first portion of one of the rod sections, and the upper end of the elongated body is axially spaced from the upper end of the rod section received by the sleeve, whereby a survey marker cap can be placed over the upper end of the one section without interference by the fins. The threaded connectors are seated in the bores in the ends of the penetrating point section and the cylindrical rod sections, connecting them in a series so that the surfaces of the upper end of the penetrating point section and the lower end of the adjacent cylindrical rod section are in engagement, and so that the upper end of each cylindrical rod section and the lower each adjacent cylindrical rod section are in engagement, whereby the driving of the penetrating point section into the ground will cause it to exert a torque on the adjacent cylindrical rod section which will be transmitted to all cylindrical rod sections so as to cause the connections between all sections to be tightened.

The sleeve serves to stabilize the top of the rod series against horizontal movement in the ground. The sleeve is inserted on the end of the last rod section in a small hole dug at the point where the rod series enters the ground, and is covered with dirt. The fins on the sleeve engage with the surrounding earth to stablize the position of the monument.

Further objects, features and advantages of the invention will be apparent from the following detailed description when taken in conjunction with the accompanying drawings.

DETAILED DESCRIPTION OF THE PREFERRED EMBODIMENT

Figure 1:
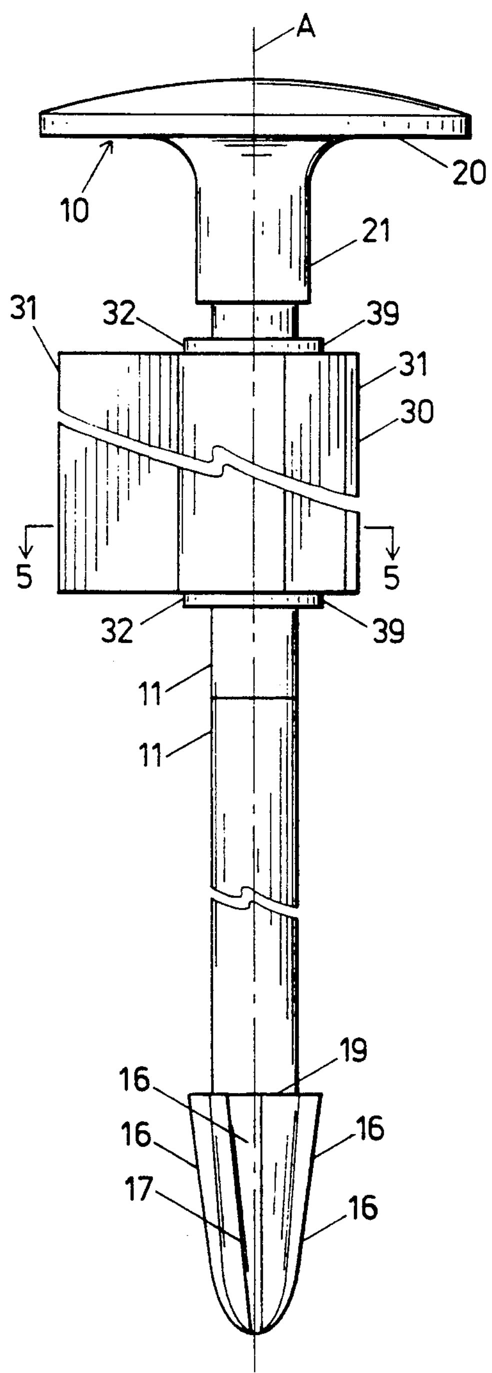
FIG. 1 is an elevation view of a survey monument embodying the principles of the present invention.
Figure 2:
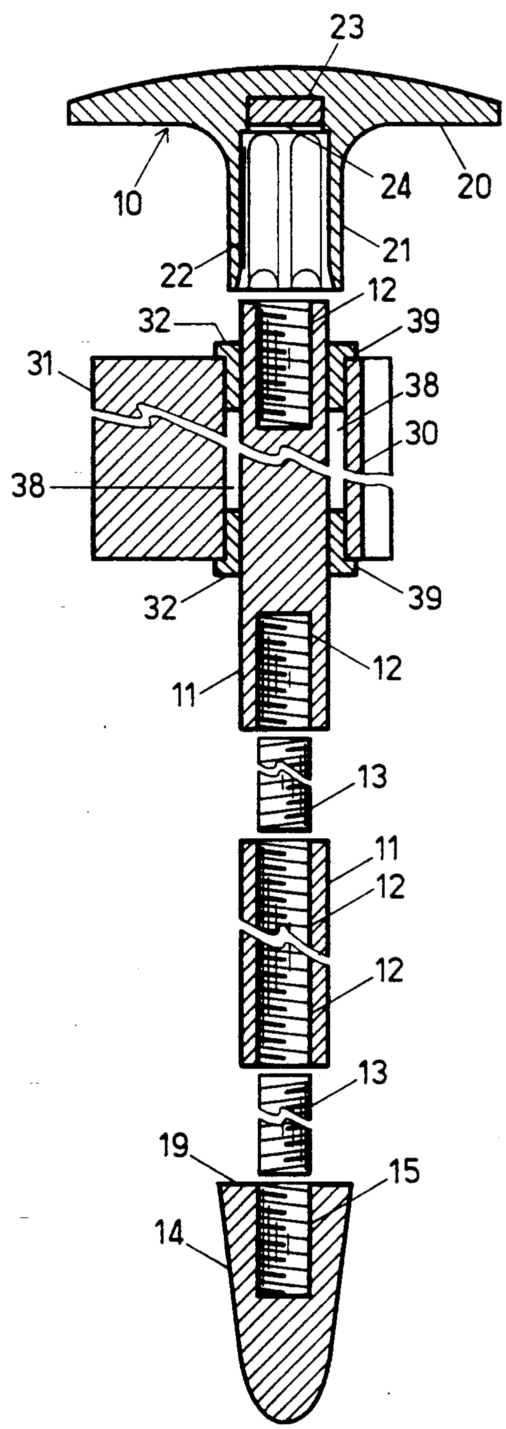
FIG. 2 is an exploded view of the survey monument shown in FIG. 1, with some parts shown in section.

Referring now more particularly to the drawings wherein like numerals refer to like parts throughout the several views, the survey monument of the present invention is shown generally at 10 in FIGS. 1 and 2.

The survey monument comprises a series of cylindrical rod sections 11, only two of which are shown for exemplification. When the series is in place the ground, a cylindrical hollow sleeve 30, having a plurality of outwardly extending fins 31, is placed over the uppermost rod section 11. The rod sections 11 are identical and may have threaded bores 12 formed in both their upper and lower ends. The rod sections 11 are coupled together by threaded connectors such as shown at 13 which are turned into the threaded bores 12 of the adjacent ends of the rod sections 11. The connectors 13 are precision machined floating studs that tightly join the ends of the rod sections 11 together in end-to-end mated alignment. A tapered penetrating point 14, shown in FIGS. 1-4, has a threaded bore 15 formed in the top end thereof and is attached to the lower end of the lowermost rod section 11 by one of the threaded connectors 13. The threaded connectors 13 and the bores 12 and 15 are all threaded in the same direction, right-hand threads being shown for exemplification.

Figure 3:
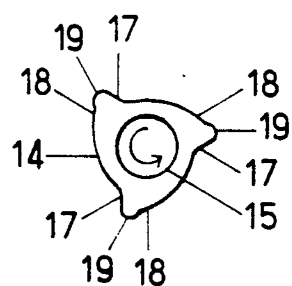
FIG. 3 is a top view of the penetrating point of the survey monument.
Figure 4:
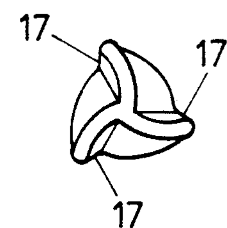
FIG. 4 is a bottom view of the penetrating point of the survey monument.

The penetrating point 14 has a plurality, (three shown) of generally longitudinal elongated barbs 16 radially spaced equally on the periphery of penetrating point 14. The barbs 16 each have a biased turning surface 17 for rotating the penetrating point 14 about its central axis A in a direction so as to tighten the threaded connections of the monument in response to downward driving of the point into the ground. As best shown in FIG. 1, each of the turning surfaces 17 is biased at an angle of about 5° from the central axis A of the penetrating point. As best shown in FIG. 3, a plurality of lead surfaces 18 opposite the turning surfaces 17, blend into the curvation of the peripheral surface of the point more gradually than the turning surfaces 17 to facilitate rotation of the point in the direction of the arrow in FIG. 3.

Each of the barbs 16 has an upwardly facing retention shoulder 19 which protrudes radially outward beyond the lower end of the lowermost rod section 11 to which the penetrating point 14 is connected to prevent removal of the monument 10 once it is emplaced in the ground.

As shown in FIGS. 1 and 2, a marker cap 20 has a socket portion 21 which has a slightly tapered, longitudinally fluted inside surface 22 adapted to be fit over the upper end of the uppermost rod section 11. The slightly tapered and fluted surface 22 provides an easy fitting yet tight connection when the cap 20 is tapped onto the rod section 11. A recess 23 in the top of the socket 21 preferably has a permanent magnet 24 mounted therein.

A case hardened steel driving head (not shown) may be provided for driving this type of monument into place. To make an emplacement, the penetrating point 14 is first attached to a rod section 11 with a threaded connector 13. The monument 11 is driven into the ground, preferably into the bottom of a small hole that has been previously dug. Initially one of the rod sections 11 is driven, and as many additional of the rod sections 11 are coupled together as needed, depending on the depth of the installation. As the penetrating point 14 is driven downwardly into the ground, the biased turning surfaces 17 of the barbs 16 cause the penetrating point 14 to rotate in a direction to tighten all of the threaded connections of the monument 10 to assure that all connections remain locked. The turning surfaces 17, which are biased at about 5°, impart approximately one revolution per 30 inches of driven depth.

Once the monument 10 is emplaced, the upwardly facing retention shoulders 19, which protrude outwardly beyond the lower end of the rod section 11 to which the penetrating point 14 is connected, provide resistance to withdrawal and effectively prevent removal of the monument 10.

When the monument 10 has been driven to the desired depth or the point of refusal the driving head (not shown) is removed and the sleeve 30, which will be described in detail below, is placed over the uppermost rod section 11. The sleeve 30 may be cut in the field to a length such that its upper end is about three inches below the upper end of the uppermost rod section 11, and is provided with at least one fin 31 to stabilize the monument 10 and inhibit lateral movement in the ground. If desirable, the sleeve 30 may be driven into the ground at the base of the hole to further increase the stability of the monument 10.

Following the application of the sleeve 30, the cap 20 is tapped onto the top end of the uppermost rod section 11. If the point of refusal is met while the top rod section protrudes well above the ground, the protruding portion of the top rod section may be cut off and the sleeve 30 applied and cap tapped onto the remaining portion of the top rod section.

The rod sections, penetrating point and marker cap are metallurgically matched so that over a period of time they fuse together naturally after the monument has been emplaced in the ground. The rod sections, point and marker cap are comprised of an aluminum-magnesium alloy whereas the threaded floating connectors are made of a high chromium-nickel alloy to provide maximum strength without creating potential galvanic action or electrolysis between the connectors and the aluminum-magnesium alloy parts.

As shown in FIGS. 1, 2, 5 and 6, each fin 31 is preferably rectangular in shape, and plural fins 31 are preferably equally spaced (radially) around the perimeter of the sleeve 30. At either end of the sleeve 30 a bushing (or reducer) 32 is inserted, before the sleeve 30 is placed over the uppermost rod section 11. The bushing 32 fits snugly within the sleeve 30 and provides a tight fit between the sleeve and the rod section 11.

It should be understood that the uppermost rod section 11 and the sleeve 30 are only partially shown in FIGS. 1 and 2. The section and sleeve typically will be 3 to 4 feet long, but may be cut to a shorter length in the field so that the top of the rod series is flush with the ground.

Figure 5:
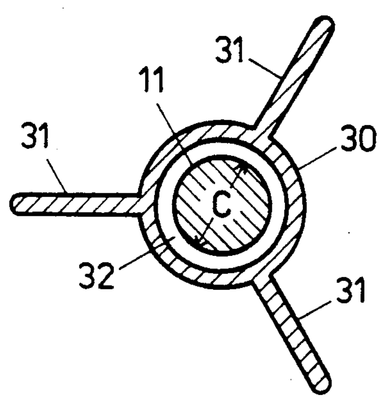
FIG. 5 is a cross-section taken along lines 5—5 of FIG. 1.
Figure 6:
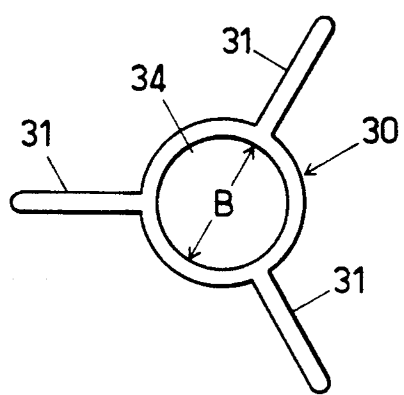
FIG. 6 is a top view of the sleeve of the present invention.
Figure 7:
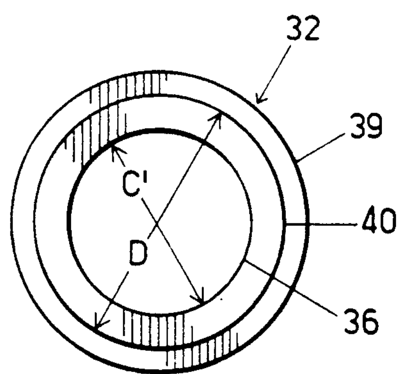
FIG. 7 is a cross-sectional view of the bushing shown in FIGS. 1, 2 and 5–6.
Figure 8:
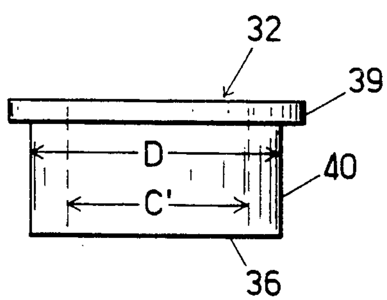
FIG. 8 is a side view of the bushing which may be utilized to hold the sleeve in place on the monument.

Referring now to FIGS. 5-7 where cross sections of the rod section 11, the sleeve 30 and the bushing 32, are shown, the sleeve 30 preferably has three fins, equally spaced as stated above, along its perimeter. In the preferred embodiment the sleeve 30, the rod section 11, and the bushing 32 all have circular cross sections, but other cross sections are possible. The sleeve 30 and the bushing 32 have generally circular hollow bores 34 and 36, respectively, as shown in FIGS. 6 and 7.

The bore 34 has an inner diameter B (FIG. 6), which is greater than the outer diameter C (FIG. 5) of the rod section 11 so that an air gap 38 (seen in FIG. 2) is formed between the outer edge of the rod section 11 and the inner edge of the sleeve 30. The gap may be filled with lubricant to allow the sleeve 30 to move freely along the rod section 11 in the axial direction. The lubricant used between the sleeve 30 and the rod section 11 should be environmentally safe. This lubricant allows vertical movement of the sleeve 30 due to the melting and refreezing of the permafrost layer. As the upper layer of the soil freezes and thaws, the sleeve 30 is pushed upward. However, because the sleeve 30 may slide along the rod section 11, the rod section 11 will remain anchored and only the sleeve 30 will move upwardly.

The sleeve 30 is preferably constructed of extruded plastic, e.g., polyvinylchloride (PVC), with the fins and body forming a single integral structure. Because the sleeve 30 may be made by extruding plastic, it is inexpensive, light, and easy to cut to size in the field. In other embodiments the sleeve 30 may be constructed of aluminum or other material.

The bushing 32 has an upper lip 39 and a lower body 40 (FIGS. 2, 3, 7 and 8) both having cylindrical cross-sections. The outer diameter D of the lower body 40 is approximately equal to the inner diameter B of the bore 34 and the outer diameter of the lip 39 is greater than the inner diameter B of the bore 34. Thus, the bushing 32 may be inserted into the bore 34 such that the lip 39 of the bushing 32 rests on the axial end of the bore 34. The bore 36 of the bushing 32 has a diameter C′, approximately 0.005 inches greater than the diameter C of the rod section 11. In any event, the diameter should be such that the rod fits snugly within the bore 36 of the bushing 32 without a significant space therebetween. The bushing may also be formed of PVC.

Figure 9:
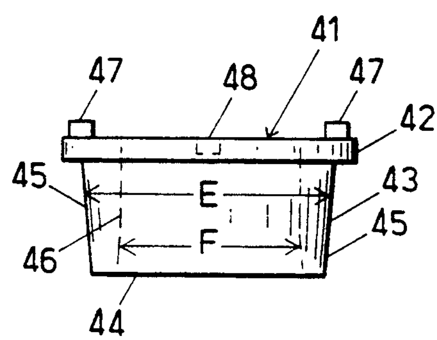
FIG. 9 is a side view of an alternative embodiment of bushing shown in FIGS. 1, 2, and 5–8.

Referring now to FIG. 9, an alternative embodiment of the bushing is shown at 41. The bushing 41 includes a lip 42 and a tapered body 43, which corresponds to the lip 39 and the lower body 40, respectively, of the bushing 32. The tapered body 43 has an outside wall 45 which is tapered inward slightly, preferably at an angle of about 2–3 degrees and most preferably at an angle of 2 degrees and 18 seconds. The outside wall defines an outside diameter E which, because the body 43 is tapered, is greatest nearest the lip 42. Accordingly, because the bushing 41 may be inserted into the sleeve 30 until there is a sufficiently tight fit (i.e when the diameter E is approximately equal to the diameter B of the bore 34), the tolerances in manufacturing the sleeve 30 and the bushing 41 need not be as strict.

Similarly, the inside wall 46 of the body 45 is tapered outward slightly, at an angle of preferably about 1 degree, such that the diameter F of the bore 44 is greatest nearest the lip 42. This allows the bushing 41 to fit tightly over the rod section 11 that is inserted therethrough, yet allows the rod section 11 to easily line up with and pass through the bushing 41 at the other end of the sleeve 30. Thus, the two bushings 41 at either end of the rod 11 do not need to be perfectly in line, and the tolerances for manufacturing the components and cutting of the sleeve in the field need not be as strict. The taper of the wall 46 also serves to provide a seal between the bushing 41 and the rod 11. This seal helps prevents water from contaminating grease inserted between the rod 11 and the sleeve 30, which lubricates the rod 11 and facilitates the movement of the rod 11 with respect to the sleeve 30.

The bushing 41 is also provided with two ejector pins 47 and two ejector pin holes 48. The ejector pins 47 and ejector pin holes 48 are spaced equally about the periphery of the lip 42 and are of the same size. Accordingly, the ejector pins from a first bushing 41 may engage the ejector pin holes from a second bushing pin 41, and visa versa. This facilitates storage and shipping, as well as extension of the sleeve (or sleeves) by coupling bushings end to end, enabling construction of a sleeve assembly of any desired length.

It is understood that the invention is not confined to the particular construction, arrangement of parts or materials herein illustrated and described, but embraces all such modified forms thereof as come within the scope of the following claims.

What is claimed is:

1. A sleeve for a driven-type survey monument, comprising:

an elongated body having a hollow bore; and a plurality of fins formed integrally with and extending outwardly from the elongated body;

wherein the hollow bore of the elongated body is adapted to receive a first portion of the survey monument, wherein a gap is formed within the hollow bore of the sleeve between the elongated body and the first portion of the survey monument.

2. The sleeve of claim 1 wherein the elongated body is a hollow cylindrical body and wherein at least one of the fins is formed such that the juncture of the one fin and the cylindrical body defines a line in the axial direction.

3. The sleeve of claim 1 wherein there are three fins on the sleeve which are substantially rectangular in shape and are spaced regularly about the periphery of the elongated body.

4. The sleeve of claim 1 wherein the sleeve is formed of extruded plastic.

5. A sleeve for a driven-type survey monument, comprising:

an elongated body having a hollow bore; and a plurality of fins formed integrally with and extending outwardly from the elongated body;

wherein the hollow bore of the elongated body is adapted to receive a first portion of the survey monument; and further including: a bushing having an outer perimeter and an inner bore, wherein the bushing is tapered such that the outer perimeter is greater at a first end of the bushing than it is at a second end of the bushing, and wherein the bushing is received by an axial end of said elongated body and the bushing receives a second portion of the survey monument.

6. The sleeve of claim 5 wherein the inner bore of the bushing has a bore perimeter, and wherein the bushing is further tapered such that the bore perimeter is greatest at the first end of the bushing, wherein the bore perimeter, at at least one location, is of substantially the same shape and size as the perimeter of the second portion of the survey monument.

7. A sleeve for a driven-type survey monument, comprising:

an elongated body having a hollow bore; and a plurality of fins formed integrally with and extending outwardly from the elongated body;

wherein the hollow bore of the elongated body is adapted to receive a first portion of the survey monument; and further including: a bushing having an outer perimeter and an inner bore, wherein the outer perimeter is substantially the same shape and size as the bore, and wherein the bushing is received by an axial end of said elongated body and the bushing receives a second portion of the survey monument.

8. The sleeve of claim 7 wherein the inner bore of the bushing has a perimeter of substantially the same shape and size as the perimeter of the second portion of the survey monument.

9. A sectionalized driven-type survey monument resistant to removal, comprising:

(a) at least one cylindrical rod section of uniform cross-section, each such rod section adapted to be connected to another rod section in end to end relationship;

(b) a penetrating point section attached to the lower end of an adjacent cylindrical rod section;

(c) a sleeve having an elongated body with a hollow bore, and straight fins formed integrally with and extending outwardly from the elongated body, wherein the hollow bore receives a first portion of one of the rod sections, and further wherein the upper end of the elongated body is axially spaced from the upper end of the one rod section, whereby a survey marker cap can be placed over the upper end of the one rod section without interference by the fins.

10. The monument of claim 9 further including threaded connectors seated in threaded bores formed in the ends of the penetrating point section and the cylindrical rod sections, connecting them in a series so that the surfaces of the upper end of the penetrating point section and the lower end of the adjacent cylindrical rod section are in engagement, and so that the upper end of each cylindrical rod section and the lower end of each adjacent cylindrical rod section are in engagement, wherein the penetrating point has barbs with biased turning surfaces, whereby the driving of the penetrating point section into the ground will cause it to exert a torque on the adjacent cylindrical rod section which will be transmitted to all cylindrical rod sections so as to cause the connections between all rod sections to be tightened.

11. The monument of claim 9 wherein the elongated body is a hollow cylindrical body.

12. The monument of claim 9 wherein there are three fins on the sleeve which are substantially rectangular in shape and are spaced regularly about the periphery of the elongated body.

13. The monument of claim 9 wherein the cylindrical rod sections and the penetrating point section are formed of an aluminum-magnesium alloy, and wherein the sleeve is formed from extruded plastic and the fins are formed integrally with the elongated body.

14. The monument of claim 9 including an aluminum marker cap having a downwardly extending socket portion having a longitudinally fluted socket therein adapted to fit tightly over the upper end of the uppermost rod section.

15. The monument of claim 9 wherein the upper end of the sleeve is at least three inches from the upper end of the one rod section.

16. The monument of claim 9 further including:

a bushing having an outer perimeter of substantially the same shape and size as the hollow bore, and an inner bore;

wherein the bushing is received by an axial end of said elongated body; and the bushing receives a second portion of the survey monument in its inner bore.

17. The monument of claim 16 wherein the inner bore of the bushing has a perimeter of substantially the same shape and size as the perimeter of the second portion of the survey monument.

18. The monument of claim 9 wherein a gap is formed within the hollow bore of the sleeve between the elongated body and the first portion of the survey monument.

19. The monument of claim 9 further including:

a tapered bushing having an outer perimeter greatest near a first end of the bushing, wherein at at least one location the outer perimeter is of substantially the same shape and size as the hollow bore, and an inner bore;

wherein the bushing is received by an axial end of said elongated body; and the bushing receives a second portion of the survey monument in its inner bore.

20. The monument of claim 19 wherein the bushing is furthered tapered such that the inner bore of the bushing has a bore perimeter greatest at the first end of the bushing , wherein at at least one location the bore diameter is of substantially the same shape and size as the perimeter of the second portion of the survey monument.

21. The monument of claim 9 wherein the sleeve is formed of extruded plastic.

* * * * *